US005514847A

United States Patent [19]

Makishima et al.

[11] Patent Number: 5,514,847

[45] Date of Patent: May 7, 1996

[54] ELECTRON BEAM RADIATOR WITH COLD CATHODE INTEGRAL WITH FOCUSING GRID MEMBER AND PROCESS OF FABRICATION THEREOF

[75] Inventors: Hideo Makishima; Keizo Yamada; Yoshinori Tomihari, all of Tokyo, Japan

[73] Assignee: NEC Corporation, Tokyo, Japan

[21] Appl. No.: 185,386

[22] Filed: Jan. 24, 1994

[30] Foreign Application Priority Data

Jan. 25, 1993 [JP] Japan .................................... 5-009631

[51] Int. Cl.⁶ .............................. B23K 15/00; H01J 1/46

[52] U.S. Cl. .............................. 219/121.12; 219/121.27; 313/308; 313/309

[58] Field of Search ......................... 219/121.12, 121.25, 219/121.26, 121.27; 313/306, 307, 308, 309, 311, 351, 336

[56] References Cited

U.S. PATENT DOCUMENTS

| | | | |
|---|---|---|---|
| 3,581,148 | 5/1971 | Brignet . | |
| 3,665,241 | 5/1972 | Spindt et al. . | |
| 4,498,952 | 2/1985 | Christensen | 313/309 |
| 4,575,765 | 3/1986 | Hirt . | |
| 5,124,664 | 6/1992 | Cade et al. | 313/309 |
| 5,164,632 | 11/1992 | Yoshida et al. | 313/309 |
| 5,186,670 | 2/1993 | Doan et al. | 445/24 |
| 5,191,217 | 3/1993 | Kane et al. | 313/308 |
| 5,430,347 | 7/1995 | Kane et al. | 313/309 |

FOREIGN PATENT DOCUMENTS

| | | | |
|---|---|---|---|
| 0500133 | 8/1992 | European Pat. Off. | 313/311 |
| 63-229863 | 9/1988 | Japan . | |
| 1-300558 | 12/1989 | Japan . | |
| 2-90508 | 3/1990 | Japan . | |
| 3-22329 | 1/1991 | Japan . | |
| 3-208241 | 9/1991 | Japan . | |
| 3-236144 | 10/1991 | Japan . | |

OTHER PUBLICATIONS

G. Wallis et al., "Field Assisted Glass–Metal Sealing," *Journal of Applied Physics,* vol. 40, No. 10, Sep. 1969, pp. 3946–3949.

*Primary Examiner*—Teresa J. Walberg
*Assistant Examiner*—Gregory L. Mills
*Attorney, Agent, or Firm*—Burns, Doane, Swecker & Mathis

[57] ABSTRACT

A first laminated sub-structure having a semiconductor substrate, a lower insulating layer on the semiconductor substrate, emitter electrodes formed in micro-apertures in the lower insulating layer and a gate electrode on the upper surface of the lower insulating layer is aligned with a second laminated sub-structure having a transparent upper insulating layer and a grid member on the transparent upper insulating layer by means of a stepper, and the first and second laminated sub-structures are fixed to each other through a field assisted glass-metal sealing technique.

2 Claims, 9 Drawing Sheets

ELECTRON BEAM RADIATOR WITH COLD CATHODE INTEGRAL WITH FOCUSING GRID MEMBER AND PROCESS OF FABRICATION THEREOF

FIELD OF THE INVENTION

This invention relates to an electron beam radiator and, more particularly, to an electron beam radiator having a cold cathode integral with a grid member for focusing an electron beam and a process of fabrication thereof.

DESCRIPTION OF THE RELATED ART

Referring first to FIG. 1 of the drawings, a typical example of the electron beam gun comprises a cold cathode member 1, a first grid member 2 negatively biased with respect to the cold cathode member 1, a second grid member 3 positively biased with respect to the cold cathode member 1 and a final grid member 4 also positively biased with respect to the cold cathode member 1. The second grid member 3 and the final grid member 4 are usually applied with hundreds volts and with several kilo-volts, and electrons radiated from the cold cathode member 1 form an electron beam under electric field created by the grid members 2, 3 and 4.

The cold cathode member 1 has a cold cathode chip 1*a* attached to the front surface of the cold cathode member 1, and apertures 2*a*, 3*a* and 4*a* are respectively formed in the grid members 2, 3 and 4. The aperture 2*a* is aligned with the cold cathode chip 1*a* during assembly of the electron beam gun, and, for this reason, the outer periphery of the cold cathode chip 1*a* is liable to be overlapped with the inner periphery 2*b* of the grid member 2. In other words, the alignment between the cold cathode chip 1*a* and the aperture 2*a* is depending on the accuracy of the assembling work of the electron beam gun, and a good alignment is hardly achieved.

The cold cathode chip 1 is fabricated on a semiconductor substrate 1*b*, and the major surface of the semiconductor substrate 1*b* is covered with an insulating layer 1*c*. A large number of micro-holes are formed in the insulting layer 1*c*, and expose the small-areas of the major surface of the semiconductor substrate 1*b*. A large number of emitter electrodes 1*d* are formed on the exposed small areas of the major surface, and a gate electrode 1*e* is patterned on the top surface of the insulating layer 1*c*. The emitter electrodes 1*d* are shaped in a conic, and are accommodated in the respective micro-holes. The conic-shaped emitter electrodes 1*d* respectively have sharp vertexes, and the sharp vertexes are surrounded by the gate electrode 1*e*.

The gap between the gate electrode and each vertex is so small that potential difference of the order of tens volts causes the sharp vertexes to emit electrons, and the electrons thus emitted are attracted toward the grid members 2, 3 and 4. The electrons emitted from in the central area of the major surface pass through the apertures 2*a* and 3*a* regardless of the accuracy of the assembling work, are accelerated in the electric field, thereby forming the electron beam 5. However, if the cold cathode chip 1*a* is mis-aligned with the grid member 2, the electrons from the periphery of the major surface are forced back toward the gate electrode 1*e* due to the negatively biased grid member 2, and impinge on the gate electrode 1*e*. The impinging electrons raise the temperature of the gate electrode 1*e*, and the heated gate electrode 1*e* emits gas. As a result, the gate electrode 1*e* is eroded and deformed.

Therefore, a problem encountered in the prior art electron beam gun shown in FIG. 1 is short operating time due to the erosion of the gate electrode 2.

Another prior art cold cathode chip is disclosed in Japanese Patent Publication of Unexamined Application (Kokai) No. 1-300558, and is illustrated in FIG. 3 of the drawings. The cold cathode chip disclosed in the Japanese Patent Publication is fabricated on a semiconductor chip 11, and the major surface of the semiconductor chip 11 is covered with a lower insulating layer 12. Although only one micro-hole 13 is shown in FIG. 3, a large number of micro-holes are formed in the lower insulating layer 12, and a conic-shaped emitter electrode 14 are held in contact with a small-area exposed to each micro-hole 13. A gate electrode 15 is patterned on the upper surface of the lower insulating layer 12, and is overlain by an upper insulating film 16. A collector electrode 17 is further patterned on the upper surface of the upper insulating layer 16, and micro-holes formed in the gate electrode 15, the upper insulating layer 16 and the collector electrode 17 are substantially aligned with the micro-holes 13 of the lower insulating layer 12.

In operation, electric field between the emitter electrodes 14 and the gate electrode 15 causes the emitter electrodes 14 to emit electrons as similar to the first prior art cold cathode chip 1*a*, and the collector electrode 17 accelerates the electrons.

However, the collector electrode 17 can not focus the electrons emitted from the large number of emitter electrodes 14, and the cold cathode chip shown in FIG. 3 is accompanied with the grid structure, i.e., the grid members 2, 3 and 4 shown in FIG. 1 for forming an electron beam gun. For this reason, even if the cold cathode chip 1*a* is replaced with the cold cathode chip shown in FIG. 3, the cold cathode chip shown in FIG. 3 does not solve the problem inherent in the prior art electron beam gun, and the aggregated electron beam gun still suffers from short service time. Moreover, the upper insulating layer 16 forms a parasitic capacitor together with the gate electrode 15 and the collector electrode 17, and the gate electrode 15 can not respond to a high frequency control signal due to the parasitic capacitor.

Finally, a patterning of a laminated structure is effective against mis-alignment between the emitter electrodes 14, the gate electrode 15 and the collector electrode 17. However, such patterning techniques are available for relatively thin films, and the upper insulating layer 16 deposited through a chemical vapor deposition is of the order of several microns as taught by Japanese Patent Publication of Unexamined Application No. 3-236144. If the upper insulating layer 16 is thin, the collector electrode 17 is close to the vertexes of the emitter electrodes 14, and large voltage difference can not be applied between them. Then, the collector electrode 17 can not effectively control the electrons emitted therefrom.

An electron beam gun forms a part of a flat image display unit, and yet another prior art electron beam gun is incorporated in the flat image display unit disclosed in Japanese Patent Publication of Unexamined Application (Kokai) No. 3-22329. FIG. 4 illustrates the flat image display unit disclosed in the Japanese Patent Publication, and the prior art flat image display unit comprises an electron beam radiator 21, an array of insulating post members 22 and a glass plate structure 23. The electron beam radiator 21 is fabricated on an insulating board member 21*a*, and comprises an array of insulating post members 21*b* arranged on a major surface of the insulating board member 21*a* and a plurality of cold cathode chips fabricated on respective semiconductor substrates 21c provided between the insulating post members 21b. The cold cathode chips are similar to the cold cathode chip shown in FIG. 3, and has emitter electrodes 21d, a gate electrode 21e patterned on a lower insulating layer and an electron-drawing-out electrode 21f. An array of insulating post members 21g is provided on the electron-drawing-out electrodes 21f, respectively, and a plurality of focusing electrodes 21h are attached to the top surfaces of the insulating post members 21g, respectively. The array of insulating post members 22 are fixed to the focusing electrodes 21h, and vacuum spaces are created between the cold cathode chips and the glass plate structure 23.

In operation, control signals are selectively applied to the gate electrodes 21e, and allow the emitter electrodes 21d of the associated cold cathode chips to emit electrons. The electron beams are accelerated by the electron-drawing-out electrodes 21f, and the focusing electrodes 21h focuses the electron beams on the glass plate structure 23. As a result, micro-spots are produced on a fluorescent screen of the glass plate structure 23. However, while the focusing electrodes 21g are being assembled with the array of insulating post members 21g, mis-alignment is liable to take place, and the electron beam radiator also encounters the problem inherent in the first prior art example. Moreover, the electron beam radiator shown in FIG. 4 can not produce extremely long electron beams necessary for a traveling-wave tube and a klystron.

SUMMARY OF THE INVENTION

It is therefore an important object of the present invention to provide an electron beam radiator which is operated for a prolonged time period.

It is another important object of the present invention through which the cold cathode chip is integral with a grid electrode.

To accomplish the object, the present invention proposes to integral an upper insulating layer with a grid electrode with a gate electrode on a lower insulating layer surrounding emitter electrodes.

In accordance with one aspect of the present invention, there is provided an electron beam radiator comprising: a) a cold cathode having a cold cathode chip fabricated on a substrate having a central area and a peripheral area, the cold cathode chip comprising a lower insulating layer formed on the peripheral area of the substrate and having a plurality of first apertures exposing a plurality of central sub-areas of the central area, a plurality of emitter electrodes respectively formed in the central sub-areas, and respectively accommodated in the plurality of apertures, a gate electrode formed on the lower insulating layer and having a plurality of second apertures respectively exposing the plurality of emitter electrodes, the gate electrode being biased with respect to the plurality of emitter electrode for allowing the plurality of emitter electrodes to respectively emit electron sub-beams, and an upper insulating layer formed on the gate electrode and having a third aperture exposing the central area and an inner peripheral sub-area of the peripheral area; and b) a grid structure including a grid electrode fixed to the upper insulating layer and having a fourth aperture exposing the plurality of emitter electrode, the grid electrode being biased with respect to the plurality of emitter electrodes for causing the electron sub-beams to converge into an electron beam.

In accordance with another aspect of the present invention, there is provided a process of fabricating an electron beam radiator comprising the steps of: a) preparing a first laminated sub-structure and a second laminated sub-structure, the first laminated sub-structure comprising a semiconductor substrate, a first insulating layer formed on a major surface of the semiconductor substrate and having a plurality of first apertures exposing central sub-areas of a central area on the major surface, a plurality of emitter electrodes respectively formed on the central sub-areas and accommodated in the first apertures, and a gate electrode formed on the first insulating layer and having a plurality of second apertures exposing the plurality of emitter electrodes, the second laminated sub-structure comprising a second insulating layer formed having a third aperture larger in area than the central area, and a grid electrode formed on the second insulating layer and having a fourth aperture larger in area than the central area; b) aligning the first laminated sub-structure with the second laminated sub-structure by means of an optical aligning system in such a manner that the central area is positioned inside of the third and fourth apertures; and c) fixing the first laminated sub-structure to the second laminated sub-structure.

BRIEF DESCRIPTION OF THE DRAWINGS

The features and advantages of the electron beam radiator and the process of fabricating thereof according to the present invention will be more clearly understood from the following description taken in conjunction with the accompanying drawings in which.

DESCRIPTION OF THE PREFERRED EMBODIMENTS

First Embodiment

Figure 1:
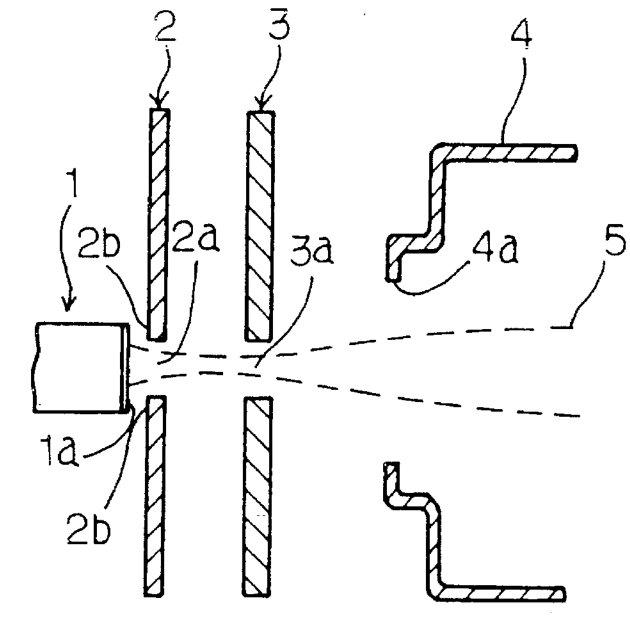
Fig·1 PRIOR ART
FIG. 1 is a cross sectional view showing the structure of the prior art electron beam radiator.
Figure 2:
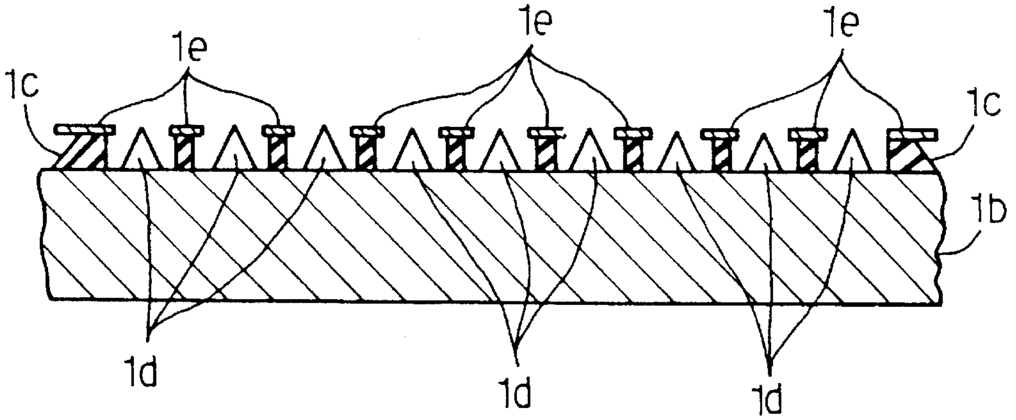
Fig·2 PRIOR ART
FIG. 2 is a cross sectional view showing the structure of the cold cathode chip incorporated in the prior art electron beam radiator.
Figure 3:
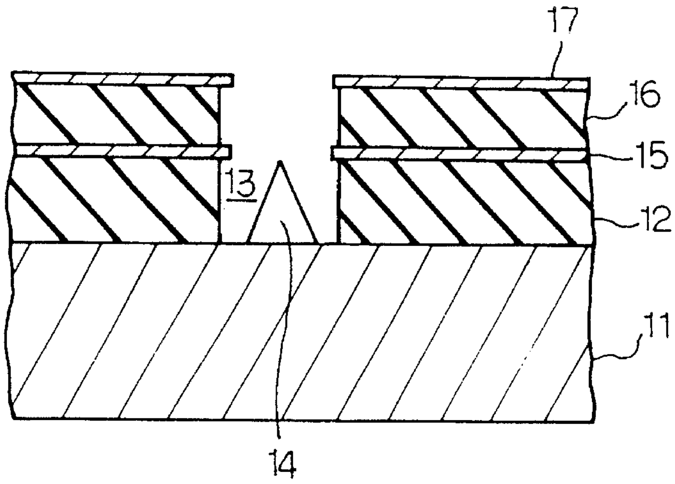
Fig.3 PRIOR ART
FIG. 3 is a cross sectional view showing the structure of the prior art cold cathode chip disclosed in Japanese Patent Publication of Unexamined Application No. 1-300558.
Figure 4:
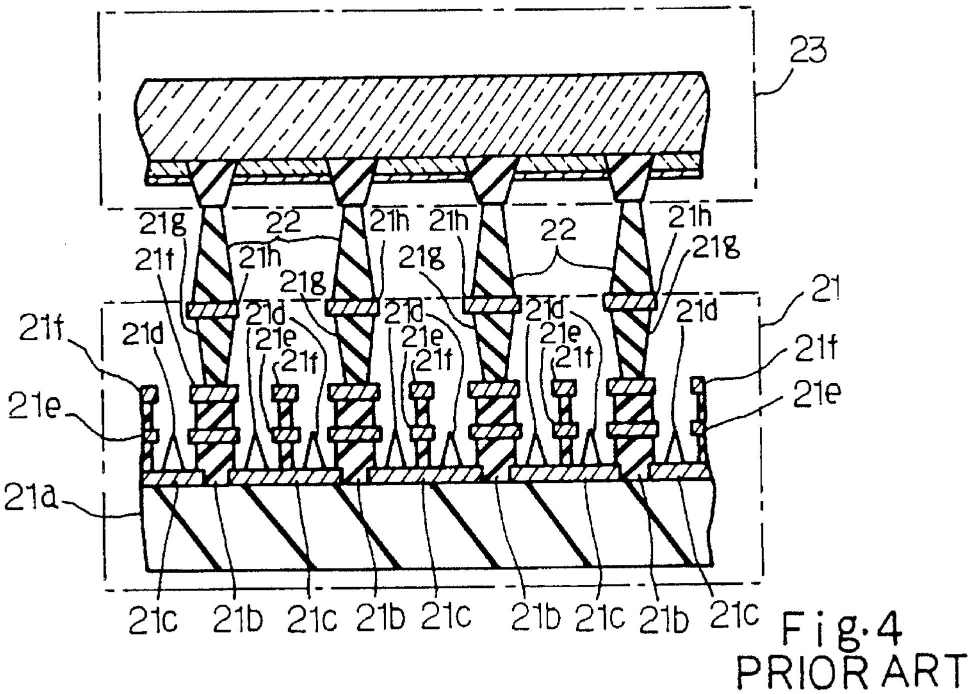
Fig.4 PRIOR ART
FIG. 4 is a cross sectional view showing the structure of the prior art flat image display unit disclosed in Japanese Patent Publication of Unexamined Application No. 3-22329.
Figure 5:
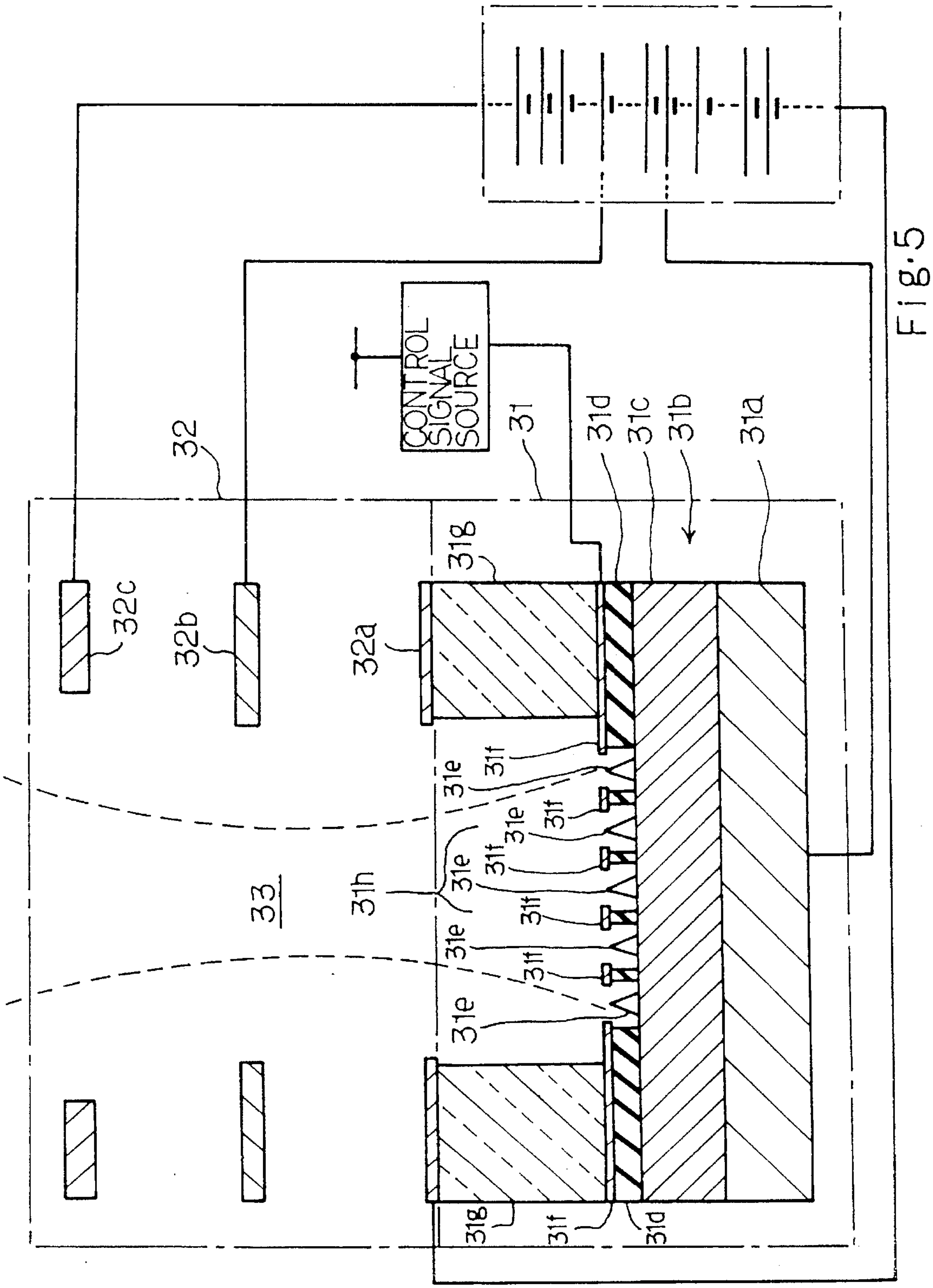
FIG. 5 is a cross sectional view showing the structure of an electron beam radiator according to the present invention.

Referring to FIG. 5 of the drawings, an electron beam gun embodying the present invention largely comprises an electron beam radiator 31 and a grid structure 32 partially integrated with the electron beam radiator 31 as described hereinlater. The electron beam gun is incorporated in a cathode ray tube for forming a spot on a screen (not shown). The electron beam gun shown in FIG. 5 is available for an image pick-up tube.

The electron beam radiator 31 comprises a cold cathode member 31$a$ and a cold cathode chip 31$b$ attached to the cold cathode member 31$a$, and the cold cathode chip 31$b$ is fabricated on a semiconductor substrate 31$c$ of silicon.

On the semiconductor substrate 31$c$ is formed a lower insulating film 31$d$ which has a plurality of micro-apertures exposing small central sub-areas in an central area of the semiconductor substrate 31$c$. A plurality of conic-shaped emitter electrodes 31$e$ are held in contact with the small central sub-areas, and are, accordingly, accommodated in the micro-apertures. Each of the emitter electrodes 31$e$ has a sharp vertex, and the sharp vertexes are as high as the lower insulating film 31$d$.

A gate electrode 31$f$ is patterned on the upper surface of the lower insulating film 31$d$, and is close so as to allow the emitter electrodes 31$e$ to emit electrons under bias conditions described hereinlater.

On the gate electrode is provided an upper insulating layer 31$g$ which ranges from ten microns to hundreds microns in thickness depending upon the following factors. The factors are the size of each micro-cold cathode 31$h$, i.e., the combination of each emitter electrode 31$e$ and the gate electrode 31$f$ around the emitter electrode 31$e$, a path in the grid structure 32 and a bias voltage applied to the grid structure 32.

If the micro-cold cathode 31$h$ is 200 microns in diameter, the upper insulating layer 31$g$ is of the order of 100 microns in thickness under a standard path and a standard bias voltage of the grid structure 32. However, if the outermost grid electrode of the structure 32 is closer than that of the standard structure or the bias voltage applied to the outermost grid electrode is higher than that of the standard structure, the thickness of the upper insulating layer 31$g$ is increased together with the position of the outermost grid electrode or with the bias voltage, and the upper insulating layer 31$g$ is twice as large in thickness as the distance between the outermost grid electrode and the cold cathode chip 31$b$ at the maximum.

On the other hand, if the outermost grid electrode is farther or the bias voltage is lower, the uppermost insulating layer 31$g$ becomes thinner, and the thickness of the uppermost insulating layer 31$g$ is decreased to a third at the minimum.

The grid structure 32 comprises a first grid electrode 32$a$ provided on the upper insulating layer 31$g$, a second grid electrode 32$b$ spaced apart from the first grid electrode 32$a$ and a third grid electrode 32$c$ spaced apart from the second grid electrode 32$b$. The cold cathode member 31$a$, the semiconductor chip 31$c$ and the emitter electrodes 31$e$ are biased to a standard voltage level, and the gate electrode 31$f$ is applied with a control signal superimposed on a positive bias voltage at 80 volts.

The first grid electrode 32$a$ is biased to –40 volts, and the second and third grid electrodes 32$b$ and 32$c$ are biased to 500 volts and 7 kilo-volts.

The emitter electrodes 31$e$ emit electron sub-beams under the bias conditions, and the first grid electrode 32$a$ converges into an electron beam 33. The second and third grid electrodes 32$b$ and 32$c$ controls the electron beam 33 as similar to those of the prior art.

The first grid electrode 32$a$ is not overlapped with the central area assigned to the emitter electrodes 31$e$, and the emitted electrons are never forced back toward the gate electrode 31$f$. As a result, the gate electrode 31$f$ is not eroded due to the forced-back electrons, and the service time of the electron beam radiator 31 is surely prolonged.

Moreover, the upper insulating layer 31$g$ appropriately positions the first grid electrode 32$a$, and the first grid electrode 32$a$ effectively controls the electron beams 33 while the electrons are traveling at relatively low speed. As a result, it is possible to produce a well controlled electron beam 33.

Description is hereinbelow made on a fabrication process for the electron beam radiator 31 integral with the first grid member 32$a$. First, the process sequence starts with preparation of a first laminated sub-structure of the emitter electrodes 31$e$, the lower insulating layer 31$d$ and the gate electrode 31$f$ fabricated on the semiconductor substrate 31$c$ and a second laminated sub-structure of the upper insulating layer 31$g$ and the first grid electrode 32$a$.

Figure 6A:
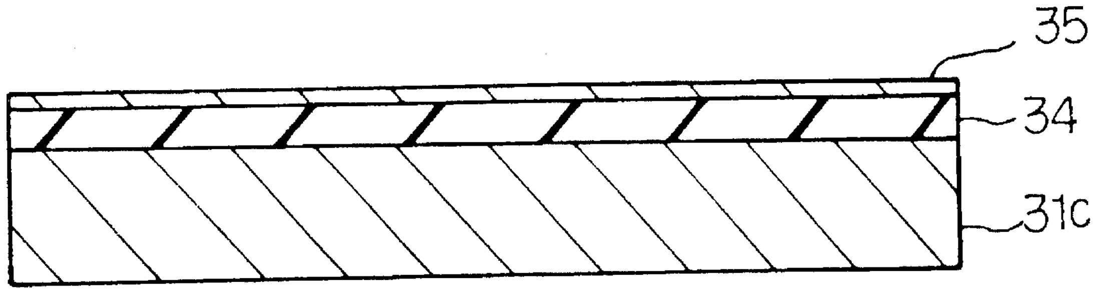
FIGS. 6A to 6D are cross sectional views showing a process of fabricating a first laminated sub-structure used in a process sequence for fabricating the electron beam radiator according to the present invention.

In detail, the semiconductor substrate 31$b$ of silicon is thermally oxidized for growing a silicon oxide film 34, and a polysilicon film 35 is deposited over the entire surface of the silicon oxide film 34 as shown in FIG. 6A.

Figure 6B:
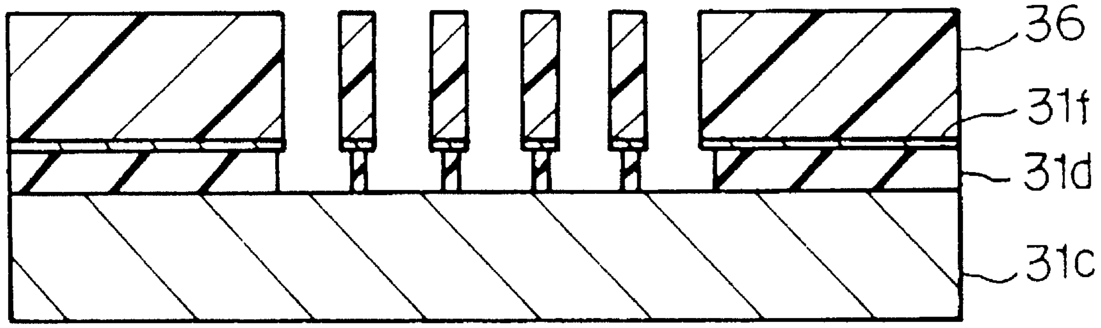

An appropriate mask 36 is provided on the polysilicon film 35 through lithographic techniques, and the polysilicon film 35 and, thereafter, the silicon oxide film 34 are partially etched away for forming the lower insulating layer 31$d$ and the gate electrode 31$f$. In this stage, alignment marks M1 are formed in the gate electrode 31$f$. The resultant structure is illustrated in FIG. 6B.

Figure 6C:
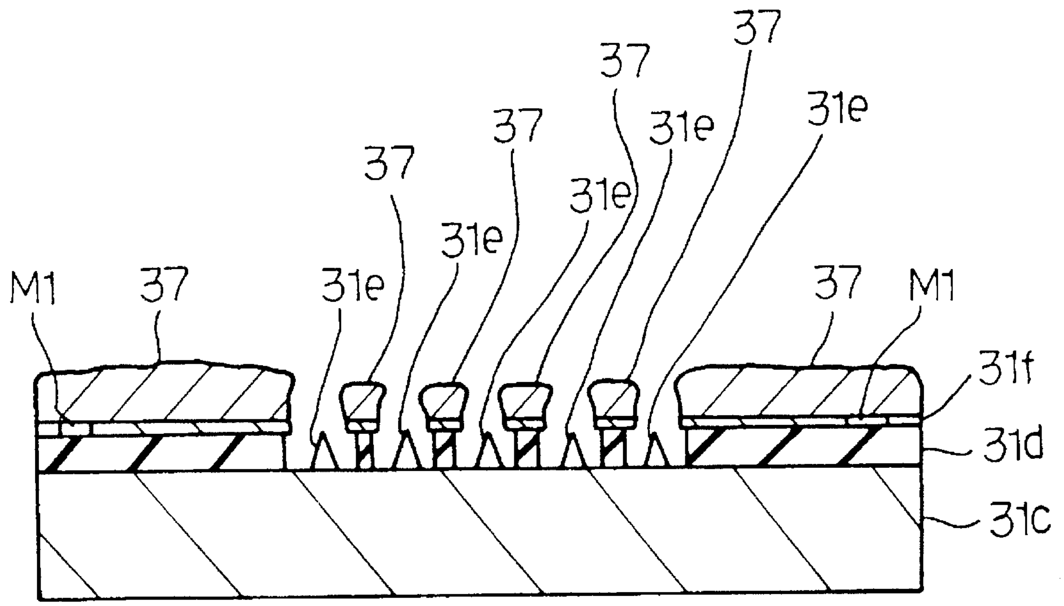

The mask 36 is stripped off, and a conductive metal is deposited over the entire surface of the structure through an evaporation technique. The conductive metal forms the conic-shaped emitter electrodes in the apertures formed in the lower insulating layer 31$d$ as shown in FIG. 6C.

Figure 6D:
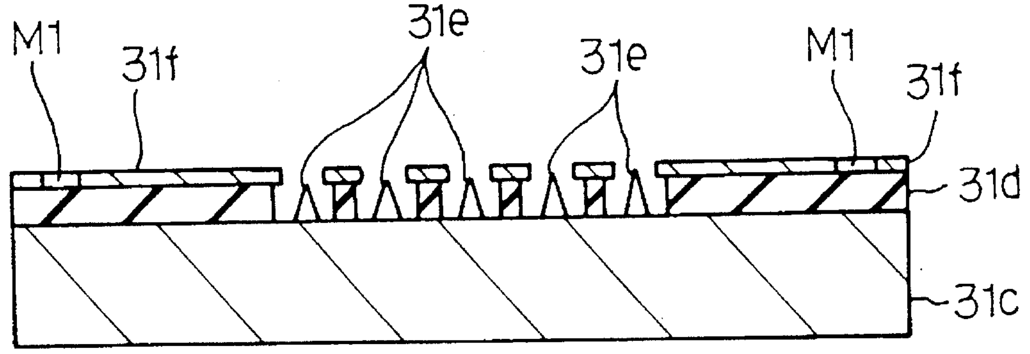

The conductive metal blocks 37 on the gate electrode 31$f$ are removed, and the alignment marks M1 are exposed again. Thus, the first laminated sub-structure is completed as shown in FIG. 6D.

On the other hand, the second laminated sub-structure is fabricated as follows. First, an appropriate insulating plate such as, for example, a pyrex glass plate 38 is grinded to predetermined thickness. The grinding may be carried out by rotating the pyrex glass plate 38 on a polished pad 39 with slurry as shown in FIG. 7A.

Upon completion of the grinding stage, an aperture 38$a$ is formed in the pyrex glass plate 38, and the pyrex glass plate 38 with the aperture 38 serves as the upper insulating layer 38$g$. The aperture 38a is wider than the central area assigned to the emitter electrodes 31$e$.

Figure 7A:
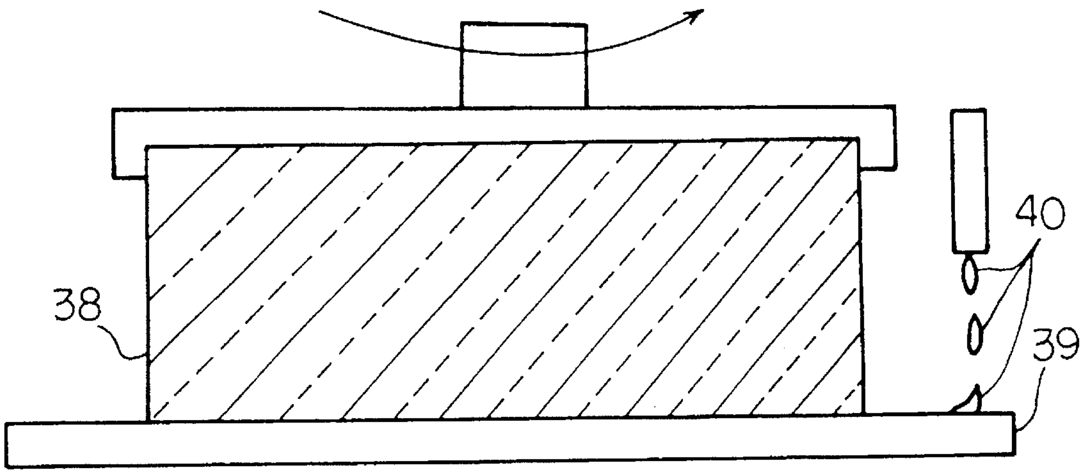
FIGS. 7A and 7B are cross sectional views showing a process of fabricating a second laminated sub-structure used in the process sequence.
Figure 7B:
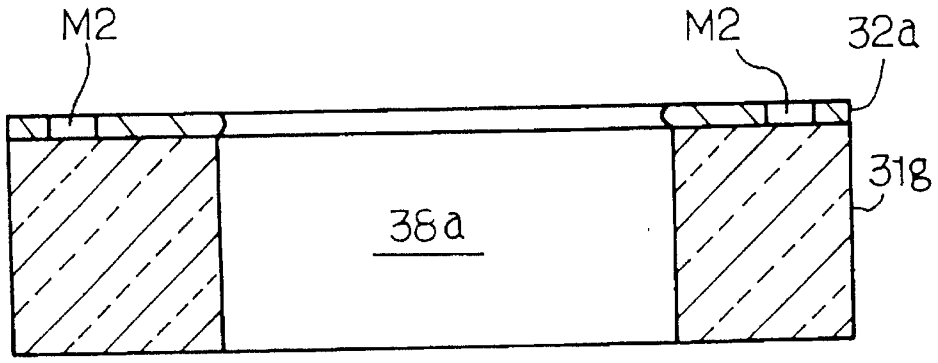

A conductive substance is deposited on the upper insulating layer 31$g$, and is patterned into the first grid electrode 32$a$ as shown in FIG. 7B. In this stage, alignment marks M2 are formed in the first grid electrode 32$a$.

The fabrication process shown in FIGS. 6A to 6D and the fabrication process shown in FIGS. 7A and 7B may simultaneously carried out, or either fabrication process may be earlier than the other fabrication process.

Figure 8:
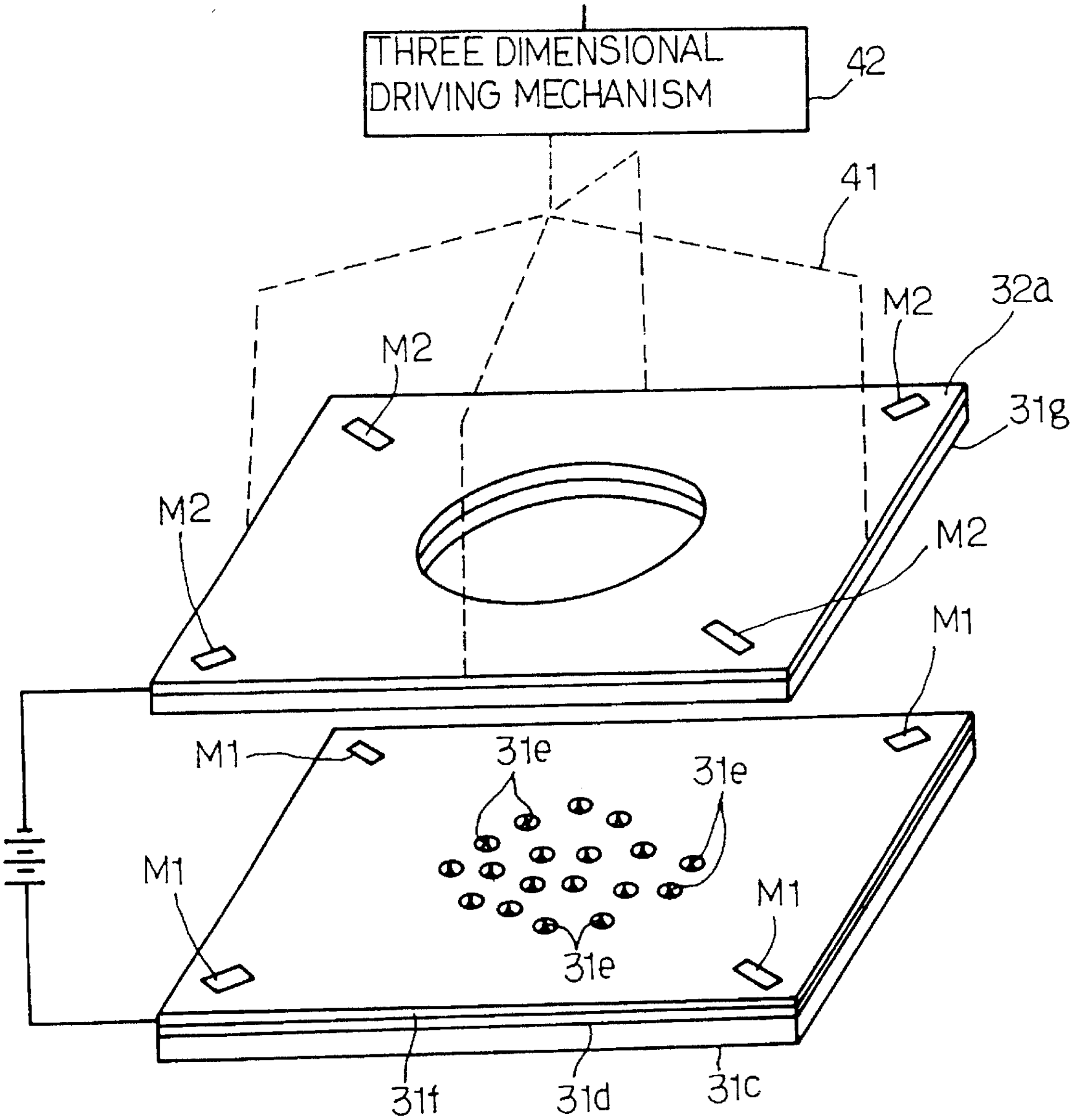
FIG. 8 is a perspective view showing a bonding step of the process for fabricating the electron beam radiator.

The first laminated sub-structure is placed on a stationary stage of a stepper, and the second laminated sub-structure is attached to a chuck 41 coupled with a three dimensional driving mechanism 42 as shown in FIG. 8. An optical alignment system of the stepper aligns the first laminated sub-structure with the second laminated sub-structure by using the alignment marks M1 and M2 in cooperation with the three dimensional driving mechanism 42, and the emitter electrodes 31$e$ in the central area are positioned under the apertures formed in the upper insulating layer 31$g$ and the grid electrode 32$a$. The three dimensional driving mechanism 42 brings the second laminated sub-structure into contact with the first laminated sub-structure, and all of the emitter electrodes 31*e* are exposed to the aperture in the upper insulating layer 31*g* and in the aperture of the grid electrode 32*a*.

Since the upper insulating layer 31*g* formed from the pyrex glass plate 38 is analogous to a reticle used in a fabrication of a semiconductor device, any stepper used in the fabrication of semiconductor devices is available in the present process sequence.

Finally, the first laminated sub-structure is integral with the second laminated sub-structure. Namely, the first laminated sub-structure and the second laminated sub-structure are brought into contact with each other, and are bonded through a field assisted-glass-metal sealing technique. The field assisted-glass-metal sealing technique is disclosed in journal of Applied Physics, vol. 40, No. 10, from page 3946, September 1969. However, another anodic connecting technique disclosed in Japanese Patent Publication of Unexamined Application No. 63-229863 may be available.

In the field-assisted-glass-metal-sealing stage, the first and second laminated sub-structures held in contact with each other under an appropriate pressure are placed in high temperature ambience between 300 degrees to 400 degrees in centigrade, and a bias voltage at 300 volts is applied between the first grid electrode 32*a* and the gate electrode 31*f*. Direct current flows for a minute. As a result, the first laminated sub-structure is fixed to the second laminated sub-structure, and a misalignment is decreased a fifth to a tenth of the prior art electron beam radiator.

Although the process sequence is focused on a single cold cathode chip, a plurality of cold cathode chips on a semiconductor wafer are integral with a plurality of grid electrodes through the process sequence described hereinbefore. Of course, the alignment marks M1 and M2 are produced on a wafer and an array of grid electrodes.

Second Embodiment

Figure 9:
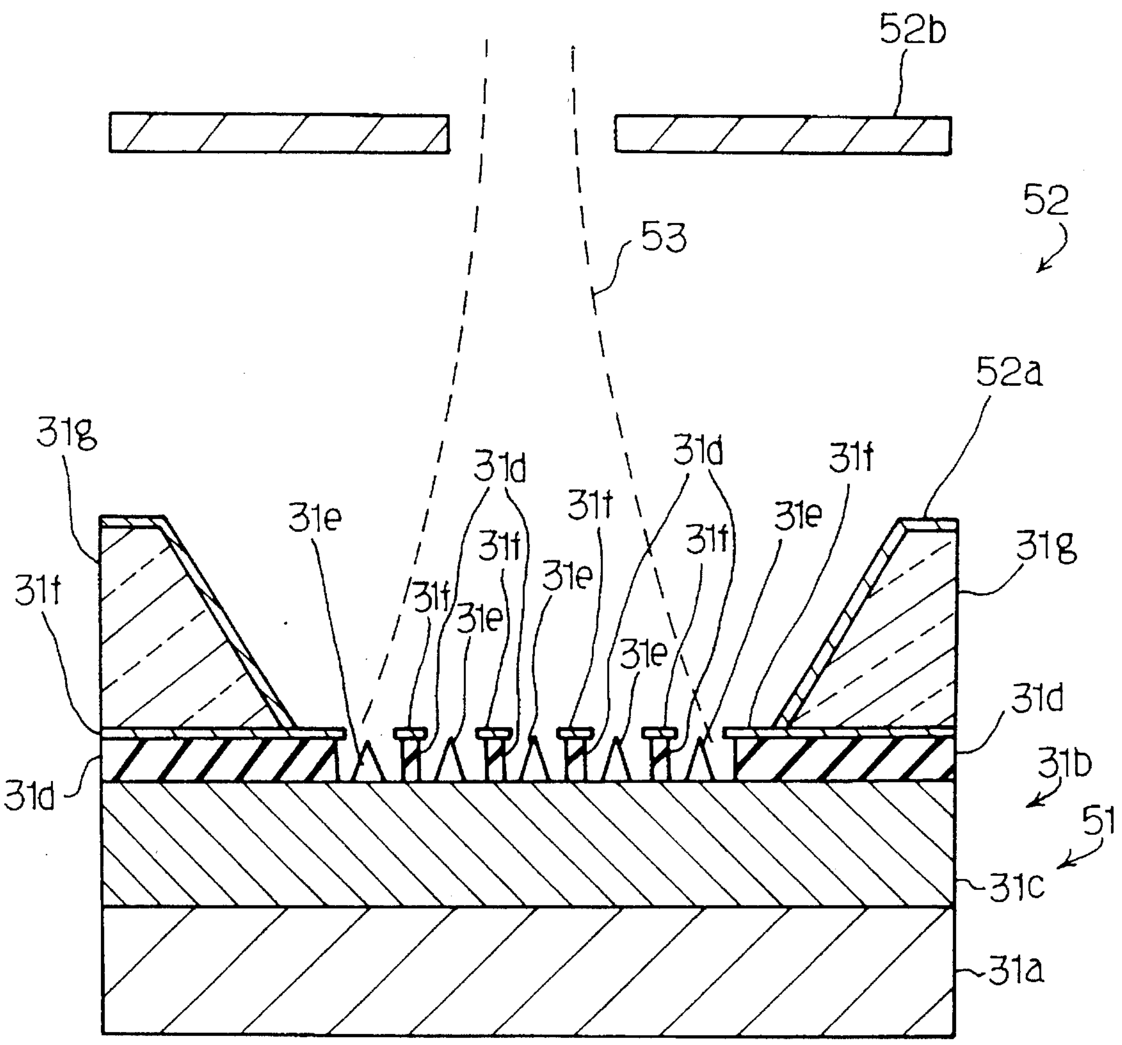
FIG. 9 is a cross sectional view showing the structure of another electron beam radiator according to the present invention.

Turning to FIG. 9 of the drawings, another electron beam gun embodying the present invention largely comprises an electron beam radiator 51 and a grid structure 52, and is available for a traveling-wave tube and a klystron. The electron beam radiator 51 is similar in structure to the electron beam radiator 31 except for an oblique inside wall of an upper insulating layer 31*g*, and the component parts are labeled with the same references used in FIG. 5 without detailed description.

The grid structure 52 comprises a first grid electrode 52*a* extending on the upper surface and the oblique inside wall of the upper insulating layer 31*g* and a second grid electrode 52*b*. The first grid electrode 52*a* is called as an Wehnelt electrode, and is applied with a bias voltage equal to that of the emitter electrodes 31*e* or with a negative bias voltage with respect to the emitter electrodes 31*e*.

Though not shown in FIG. 9, a magnetic field forms lines of magnetic force in the same direction as or the opposite direction to the advancing direction of the electrons. While traveling from the emitter electrodes 31*e* to the second grid electrode 52*a*, the electrons emitted from the emitter electrodes 31*e* are accelerated, and the diameter of the electron beam 53 is decreased. However, after the electron beam 53 exceeds the second grid electrode 52*b*, the electron beam 53 keeps the diameter constant.

The electron beam radiator 51 is fabricated through the process sequence described hereinbefore, and the electron beam radiator 51 achieves the advantages of the first embodiment.

Third Embodiment

Figure 10:
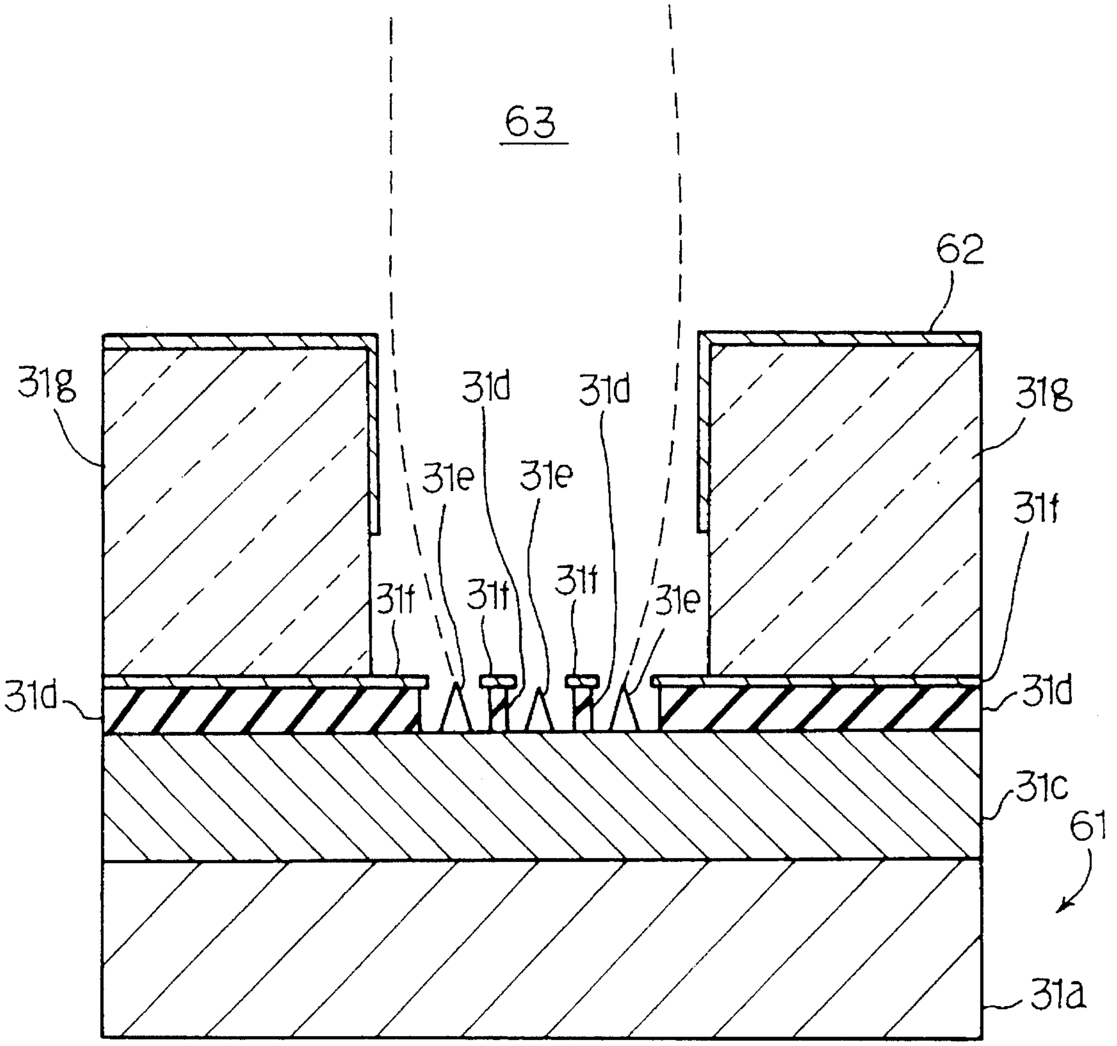
FIG. 10 is a cross sectional views showing the structure of yet another electron beam radiator according to the present invention.

Turning to FIG. 10 of the drawings, yet another electron beam gun embodying the present invention largely comprises an electron beam radiator 61 and a grid electrode 62 integral with the electron beam radiator 61, and is available for a measuring instrument or a machining system. The electron beam radiator 61 is similar in structure to the electron beam radiator 31*b*, and, for this reason, the components are labeled with the same references as those of the first embodiment.

The upper insulating layer 31*g* has an inside wall substantially vertical with respect to the gate electrode 31*f*, and the grid electrode 62 covers not only the upper surface of the upper insulating layer 31*g* but also an upper portion of the inside wall. The reason why the grid electrode 62 extends on the upper portion is that the grid electrode 62 effectively affects the electron beam 63.

In operation, the grid electrode 62 is applied with a positive bias voltage with respect to the emitter electrodes 31*e*, and the amount of current of the electron beam 63 is proportional to the potential difference between the emitter electrodes 31*e* and the gate electrode 31*f* in so far as the height of the emitter electrodes 31*e*, the height of the gate electrode 31*f* and the diameter of the apertures formed in the gate electrode 31*f* are appropriately selected. Moreover, when the diameter of the aperture of the grid electrode 62 and the height of the grid electrode 62 or the thickness of the upper insulating layer 31*g* are appropriately selected, the velocity of the electron beam 63 is determined by the potential difference between the emitter electrodes 31*e* and the grid electrode 62.

Though not shown in FIG. 10, an electrode is provided on the right side, the upper insulating layer 31*g* sufficiently increased in thickness allows the grid electrode 62 to control the electron beam 63 depending upon the potential thereof only.

Although particular embodiments of the present invention have been shown and described, it will be obvious to those skilled in the art that various changes and modifications may be made without departing from the spirit and scope of the present invention. For example, if the gate electrode 31*f* and the upper insulating layer 31*g* are plated with gold films, the gold films bond the gate electrode 31*f* to the upper insulating layer 31*g* instead of the anodic connecting technique. Moreover, if a thick upper insulating layer is shaped into steps, the first and second grid members are integrated with the electron beam radiator. Although the electric fields cause the emitter electrodes to emit the electrons in the above embodiments, MIM type elements and p-n junction type elements may be incorporated in an electron beam radiator according to the present invention. Finally, even if a plurality of electron beams are produced by an electron beam gun, the present invention is applicable thereto in so far as electron sub-beams are converged into each electron beam.

What is claimed is:

1. An electron beam radiator comprising:

a) a cold cathode having a cold cathode chip fabricated on a substrate having a central area and a peripheral area, said cold cathode chip comprising a lower insulating layer formed on said peripheral area of said substrate and having a plurality of first apertures exposing a plurality of central sub-areas of said central area, a plurality of emitter electrodes respectively formed in said central sub-areas, and respectively accommodated in said plurality of apertures, a gate electrode formed on said lower insulating layer and having a plurality of second apertures respectively exposing said plurality of emitter electrodes, said gate electrode being biased with respect to said plurality of emitter electrodes for allowing said plurality of emitter electrodes to respectively emit electron sub-beams, and an upper insulating layer formed on said gate electrode and having a third aperture exposing said central area and an inner peripheral sub-area of said peripheral area, said third aperture being substantially constant in diameter; and b) a grid structure including a grid electrode fixed to said upper insulating layer and having a fourth aperture exposing said plurality of emitter electrodes, said grid electrode being biased with respect to said plurality of emitter electrodes for causing said electron sub-beams to converge into an electron beam, said grid electrode covering an upper surface of said upper insulating layer and an upper portion of an inside wall defining said third aperture.

2. An electron beam radiator comprising:

a) a cold cathode having a cold cathode chip fabricated on a substrate having a central area and a peripheral area, said cold cathode chip comprising a lower insulating layer formed on said peripheral area of said substrate and having a plurality of first apertures exposing a plurality of central sub-areas of said central area, a plurality of emitter electrodes respectively formed in said central sub-areas, and respectively accommodated in said plurality of apertures, a gate electrode formed on said lower insulating layer and having a plurality of second apertures respectively exposing said plurality of emitter electrodes, said gate electrode being biased with respect to said plurality of emitter electrodes for allowing said plurality of emitter electrodes to respectively emit electron sub-beams, and an upper insulating layer formed on said gate electrode and having a third aperture exposing said central area and an inner peripheral sub-area of said peripheral area, said third aperture being increased in diameter from said gate electrode to an upper surface of said upper insulating layer;

b) a grid structure including a grid electrode fixed to said upper insulating layer and having a fourth aperture exposing said plurality of emitter electrode, said grid electrode being biased with respect to said plurality of emitter electrodes for causing said electron sub-beams to converge into an electron beam, said grid electrode covering said upper surface of said upper insulating layer and an inside wall defining said third aperture, and another grid electrode positively biased with respect to said plurality of emitter electrodes and spaced from said grid electrode.

* * * * *